United States Patent
Krasiński et al.

[11] 4,253,733
[45] Mar. 3, 1981

[54] GENERATOR OF A HARMONIC OF LASER LIGHT

[75] Inventors: Jerzy Krasiński; Andrzej Sieradzan, both of Warsaw, Poland

[73] Assignee: Uniwersytet Warszawski, Warsaw, Poland

[21] Appl. No.: 40,027

[22] Filed: May 18, 1979

[30] Foreign Application Priority Data

May 13, 1978 [PL] Poland .................. 206762

[51] Int. Cl.³ ................... G02F 1/37; H01S 3/10
[52] U.S. Cl. ..................... 350/380; 331/94.5 N; 350/400
[58] Field of Search ................... 350/150–151, 350/157; 250/225; 331/94.5 N; 307/427

[56] References Cited

U.S. PATENT DOCUMENTS 3,934,154  1/1976  Cook, Jr. .................. 307/427

OTHER PUBLICATIONS

Kravchenko et al., "Frequency Tuning & High-Efficiency Extraction of Second-Harmonic Radiation from a Prism Dispersion Resonator of a Neodymium Laser", Sov. Jr. of Quantum Electronics, 3,4–72, pp. 547–549.
Hitz et al., "Simultaneous Intracavity Frequency Doubling & Mode Locking in a ND:YAG Laser", App. Physics Letters, 5-1971, pp. 378–380.
Molebnyi et al., "Visualization of Infrared Point Images by a Non-Linear Optics Method Using Cylindrical Pump Wave", Sov. J. Quant. Electronics 5-1975, pp. 1299–1302.

Primary Examiner—John K. Corbin
Assistant Examiner—Wm. H. Punter
Attorney, Agent, or Firm—Ladas & Parry

[57] ABSTRACT

The invention relates to a generator of the harmonic of laser light destined in particular for application in the equipment for spectrometric measurements carried out with the laser technique. The substance of the invention is to shorten many times the optic route in the generator of the harmonic of laser light by the replacement of the system of elements of a zero dispersion by at least one dispersive element of a great dispersion, in particular by a rutile prism, combined with the system reversing the polarization surface by 90°, in particular with a 90° polarization rotator or a half-wave plate.

3 Claims, 1 Drawing Figure

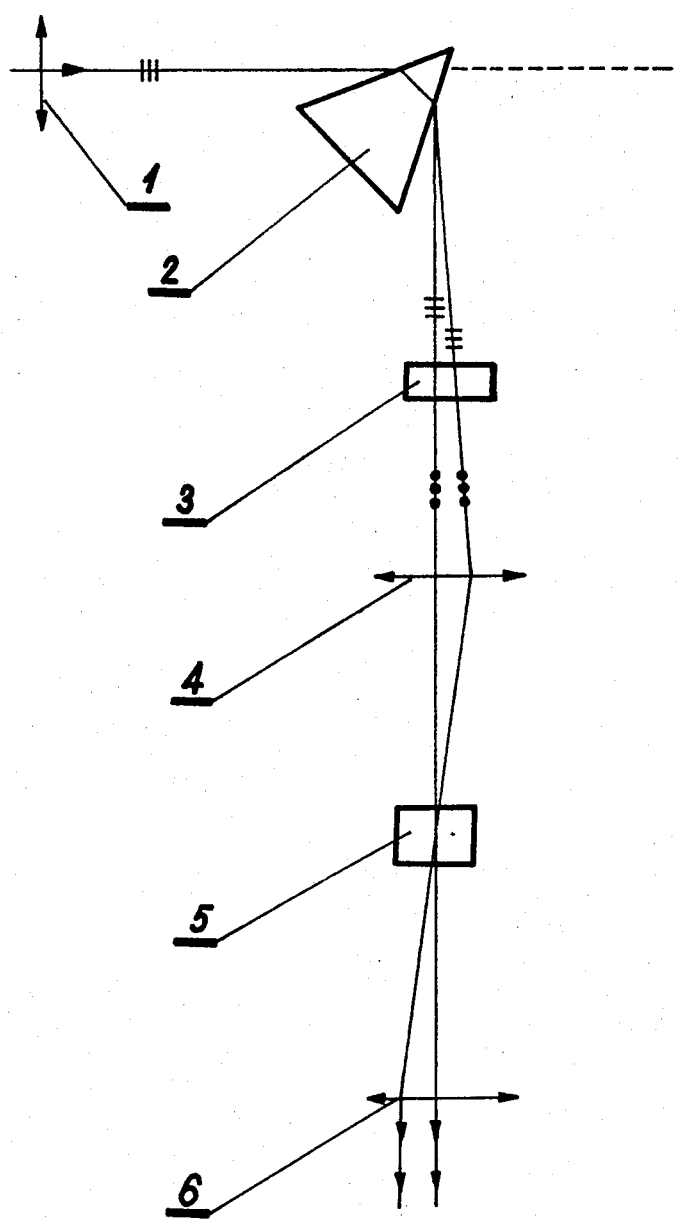

GENERATOR OF A HARMONIC OF LASER LIGHT

FIELD OF THE INVENTION

The invention relates to a generator of the harmonic of laser light and is destined for application particularly in the equipment for spectrometric measurements carried out with the laser technique, but also can be effectively used in all cases in which the laser technique may be applied.

TECHNICAL BACKGROUND

The known generators of the harmonic of the laser light are built at least of two dispersive elements, in particular of glass prisms with resulting zero dispersion, focusing lenses, a non-linear crystal and an outlet lens. The necessary condition for the installation of systems generating the harmonic of laser light is the identity of the light dispersion of the assembled dispersive elements, in particular glass prisms. These known systems are characterized by a long optic route of laser light, in particular between dispersive elements. In order to reduce the size of the generator, in some solutions the optic route is twice or even several times refracted through an adequate arrangement of mirrors.

The inconvenience of the application of other known solutions results from the fact that the manipulation with each of the elements of such a set requires special precision. This induced constructors to apply in some known generators complicated electro-mechanical systems for the control of these manipulations.

However, independently of the complicated service which results from long optic routes, the known generators are characterized by an unadequate light polarization and by a low capacity.

SUMMARY OF THE INVENTION

The substance of the invention is the fact that the optic route in the generator of the harmonic of the laser light may be many times shortened owing to an replacement of the system of dispersive elements, in particular of glass prisms with a resulting zero dispersion, by at least one dispersive element of great dispersion, in particular by a rutile prism.

As it unexpectedly resulted from investigations and experiments, the application of at least one dispersive element of a great dispersion in combination with a system reversing the polarization surface by 90°, in particular with a 90° polarization rotator of a half-wave plate, permits to shorten, even twenty times, the optic route of light in the system of the generator of harmonic. Consequently, it permits to reduce drastically the size of the equipment without a necessity of using mirrors.

According to the invention, the generator of the harmonic of laser light consists of a lens adapting the laser light to the system, further of at least one dispersive element of a great dispersion, in particular a rutile prism, a system reversing polarization surface by 90°, a focusing lens or lenses, a non-linear crystal and an outlet lens.

EXPLANATION OF THE DRAWING

A practical example of the generator according to the invention is shown on the drawing which represents the scheme of the optical system of the generator.

EXAMPLE

The generator of the harmonic of laser light contains a chassis—not shown on the drawing—in which along the optic route of light the following elements are successively mounted: a lens 1 adapting the laser light to the system, a rutile prism 2 as dispersive element, 90° polarization rotator 3 as a system reversing the polarization surface by 90°, a focusing lens 4, a non-linear crystal 5 and an outlet lens 6. The relative position of the particular elements of the generator system corresponds to the following interrelations: the sum of the reciprocal value of the distance between the dispersive element 2 and the focusing lens 4 and of the reciprocal value of the distance between the focusing lens 4 and the non-linear crystal 5 is equal to the reciprocal value of the focus of focusing lens 4, and, moreover, the ratio of the derivative with respect to wave length of the deviation angle of light beam, produced by the dispersive element 2, to the derivative with respect to wave length of the phase matching angle of the non-linear crystal 5 is equal to the product of the refraction coefficient of the non-linear crystal 5 and the ratio of the distance between the dispersive element 2 and the focusing lens 4 to the distance between the focusing lens 4 and the non-linear crystal 5.

We claim:

1. A system for generating the harmonic of a laser light beam, comprising in series, a lens for introducing a source of laser light to the system, a dispersive element having a large light dispersion characteristic, an optical element for rotating the polarization surface by 90°, a focusing lens, a non-linear crystal, and an outlet lens, wherein the ratio of the derivative with respect to the wave length of the deviation angle of the light beam, produced by the dispersive element, to the derivative with respect to the wave length of the phase-matching angle in the non-linear crystal is equal to the product of the refraction coefficient of the non-linear crystal and the ratio of the distance between the dispersive element and the focusing lens to the distance between the focusing lens and the non-linear crystal.

2. A generator according to claim 1, wherein said one dispersive element comprises a rutile prism, and said optical element comprising a 90° polarization rotator in the form of a half-wave plate.

3. A generator according to claim 1 wherein the sum of the reciprocal value of the distance between the dispersive element and the focusing lens and the reciprocal value of the distance between the focusing lens and the non-linear crystal is equal to the reciprocal value of the focal length of the focusing lens.

* * * * *